3,277,135
METHOD FOR PREPARING ORGANOSILANES
William A. Harding, Media, and Harold Shalit, Drexel Hill, Pa., assignors to Air Products and Chemicals, Inc., Philadelphia, Pa., a corporation of Delaware
No Drawing. Filed May 25, 1962, Ser. No. 197,585
10 Claims. (Cl. 260—448.2)

The present invention relates to the preparation of organosilanes of the formula:

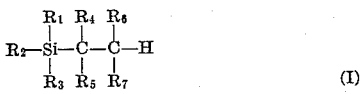
(I)

wherein $R_1$, $R_2$ and $R_7$ are separately selected from the alkyl groups of 1 to 5 carbon atoms and $R_3$, $R_4$, $R_5$ and $R_6$ are separately selected from the group consisting of hydrogen and alkyl groups of 1 to 5 carbon atoms, and more particularly, to the preparation of such organosilanes by the reaction of an alkyl silane with an olefinic hydrocarbon in the presence of certain catalysts.

We have found that organosilane compounds of Formula I may be prepared by passing both an olefinic hydrocarbon having the formula:

(II)

(e.g., propylene, butene-2, isobutylene, etc.) and an alkyl silane having the formula:

(III)

(e.g., trimethylsilane, dimethylsilane, etc.) through a reaction chamber containing certain catalysts, hereinafter described, and thereafter withdrawing an effluent stream from the catalyst chamber. The effluent stream is then cooled to obtain a condensate. An organosilane of Formula I is separated from said condensate by known distillation methods. The reaction between the alkyl silane and olefinic hydrocarbon, which components may be charged into the catalyst chamber either together or separately, takes place at quite low temperature, e.g., from 0 to 300° C. and preferably from 75 to 250° C. Pressures of 1 to 10 atmospheres may be employed although pressures near atmospheric pressure are preferred.

The catalysts which are contemplated by the invention and are necessary in order to effect alkylation are prepared by treating dried granules of at least one acidic refractory metal oxide with a silane of the formula:

(IV)

wherein $R_8$, $R_9$ and $R_{10}$ are separately selected from the group consisting of hydrogen, halogen and alkyl groups of 1 to 5 carbon atoms and $R_{11}$ is selected from the group consisting of hydrogen and alkyl groups of 1 to 5 carbon atoms. Such catalysts include those described in co-pending U.S. patent applications of Harding et al., Serial Numbers 107,645, (now U.S. Letters Patent No. 3,207,699) and 142,021 (filed May 4, 1961, and October 2, 1961, respectively).

The catalysts described in Serial No. 107,645 are prepared by treating dried granules of sorbtive solids consisting essentially of one or more acidic refractory metal oxides, said granules having a cracking activity of at least 15 as determined by the standard CAT–A test, with the vapors of organosilane of the formula:

(V)

in which each of $R_{12}$ and $R_{13}$ is an alkyl group having less than 5 carbon atoms, Q is selected from the group consisting of hydrogen and alkyl groups having less than 5 carbon atoms and Y is selected from the group consisting of halide, hydrogen and alkyl groups having less than 5 carbon atoms. Typical illustrations of such catalysts are those obtained by treating alumina-zirconia granules with dimethylchlorosilane; alumina magnesia-silica granules with ethylpropylsilane; eta alumina granules with either trimethylsilane or tetramethylsilane; silica-zirconia granules with dibutylsilane; and silica-alumina granules with trimethylsilane.

Catalysts mentioned in Serial No. 142,021 are prepared by treating granules of solids consisting essentially of one or more aluminaceous refractory metal oxides with a silane of the formula:

(VI)

in which $R_{14}$ and R are separately selected from the group of hydrogen and alkyl groups of 1 to 5 carbon atoms, X is halogen and $n$ is a whole number from 0 to 3; at least one of the substituents on Si being halogen or alkyl.

Typical illustrations of these catalysts are those obtained by treating silica-alumina granules, activated alumina granules, or alumina-zirconia granules with either methyl-trichlosilane, trimethylchlorosilane, dimethyldichlorosilane or trichlorosilane.

It is sometimes advantageous, but not necessary, to employ an inert solvent for the reactants. Usually, however, the reactants will be passed through the catalyst chamber as a gas stream. The rate at which the reactants are passed through said chamber may vary from 0.1 to 10 mols of the silane per liter of catalyst per hour.

As will be apparent to those skilled in the art, the ratio of silane to olefin may be varied within wide limits without departing from the scope of the invention. Generally, we prefer to use the olefin in a molar excess of the silane. Thus we may use a molar ratio of hydrocarbon to silane within the range of 1 to 1 to 10 to 1. Such a molar excess of the olefin is desirable to insure completion of the reaction.

In order that those skilled in the art may better understand how the present invention may be practiced, the following examples are given by way of illustration and not by way of limitation.

*Example 1*

A mixture of isobutylene and trimethylsilane in the molar ratio of 1 to 1 was reacted at 99° C. under atmospheric pressure in a chamber containing 30.8 grams of trimethylsilane treated silica-alumina catalyst. The flow rate of the olefin and silane through the chamber was 60 cc./min. The effluent stream from the catalyst chamber was cooled to a temperature below 100° C. in order to obtain a condensate.

The resulting condensate contained 26.3 mol percent isobutane formed by hydrogen transfer, 3.1 mol percent polymerization product (dimers and trimers of isobutylene) and 7.7 mol percent of isobutyltrimethylsilane obtained by alkylation. The alkylation product can be separated from the condensate by distillation.

*Example 2*

A mixture of isobutylene and trimethylsilane in the molar ratio of 3.0 to 1 was reacted at 104° C. and under atmospheric pressure in a chamber containing 30.8 grams of trimethylsilane treated silica-alumina catalyst. The flow rate of the olefin through the chamber was 60 cc./min. while the flow rate of the silane through said chamber was 20 cc./min. Upon withdrawing the effluent stream from the chamber and cooling said stream to a temperature below 100° C., it was found that the resulting condensate contained 8.5 mol percent of isobutane, 11.5 mol percent of polymerized isobutylene and 15.3 mol percent of isobutyltrimethylsilane. Separation of the isobutyltrimethylsilane from the condensate was effected by distillation.

*Example 3*

The procedure of Example 2 was repeated employing butene-2 for the isobutylene. Butyltrimethylsilane was obtained as the alkylation product.

*Example 4*

The procedure of Example 2 was again repeated employing propylene in place of isobutylene and producing propyltrimethylsilane as the alkylation product.

*Example 5*

A mixture of isobutylene and trimethylsilane in the molar ratio of 2.3 to 1 was reacted at 143° C. under atmospheric pressure in a chamber containing trimethylsilane treated silica-alumina catalyst. The flow rate of the olefin through the chamber was 70 cc./min. while that of the silane was 29 cc./min. The effluent stream from the catalyst chamber was cooled to a temperature below 100° C. in order to obtain a condensate.

Analysis of the resulting condensate by mass spectrography and gas chromatography indicated the presence of 26.1 mol percent isobutyltrimethylsilane, 2.7 mol percent octyltrimethylsilane, 4.4 mol percent isobutane and 8.5 mol percent of the dimer of isobutene.

The compounds prepared in accordance with our process have utility as intermediates in the preparation of other compositions. Organosilicon compounds of the type derivable from the above alkyl silanes may be added to hydrocarbon oils to prevent foaming thereof or they may be added to various pigmented paints to prevent separation or flocculation of the pigment.

Obviously, many modifications and variations of the invention as hereinbefore set forth may be made without departing from the spirit and scope thereof, and therefore only such limitations should be imposed as are indicated in the appended claims.

What is claimed is:

1. The method of preparing compounds having the formula:

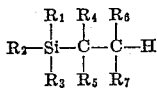

wherein $R_1$, $R_2$, and $R_7$ are separately selected from alkyl groups of 1 to 5 carbon atoms and wherein $R_3$, $R_4$, $R_5$ and $R_6$ are separately selected from the group consisting of hydrogen and alkyl, which method comprises the steps of: preparing a mixture of olefinic hydrocarbons having the formula:

and an alkyl silane having the formula:

passing said mixture through a reaction chamber containing catalyst prepared by treating hot dried granules consisting essentially of silica-alumina with a silane of the formula:

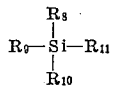

wherein $R_8$, $R_9$ and $R_{10}$ are separately selected from the group consisting of hydrogen, halogen and alkyl groups of 1 to 5 carbon atoms and $R_{11}$ is selected from the group consisting of hydrogen and alkyl groups of 1 to 5 carbon atoms; at a temperature within the range from 0 to 300° C. and a pressure of from 1 to 10 atmospheres; withdrawing an effluent stream from the catalyst chamber; cooling the effluent stream to a temperature of below 100° C. to obtain a condensate; and separating an organosilane of the formula:

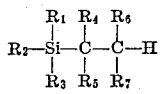

from said condensate.

2. The method of preparing compounds having the formula:

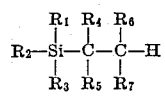

wherein $R_1$, $R_2$, and $R_7$ are separately selected from alkyl groups of 1 to 5 carbon atoms and wherein $R_3$, $R_4$, $R_5$ and $R_6$ are separately selected from the group consisting of hydrogen and alkyl, which method consists of the steps of: admixing an olefinic hydrocarbon having the formula:

and an alkyl silane having the formula:

prior to introducing the admixture into a catalyst chamber; passing said mixture through a chamber containing catalyst prepared by treating hot dried granules consisting essentially of silica-alumina with a silane of the formula:

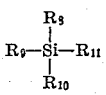

wherein $R_8$, $R_9$ and $R_{10}$ are separately selected from the group consisting of hydrogen, halogen and alkyl groups of 1 to 5 carbon atoms and $R_{11}$ is selected from the group consisting of hydrogen and alkyl groups of 1 to 5 carbon atoms; at a temperature within the range of from 0 to 300° C. and a pressure of from 1 to 10 atmospheres; withdrawing an effluent stream from the catalyst chamber; cooling the effluent stream to a temperature of below 100° C. to obtain a condensate; and separating an organosilane of formula:

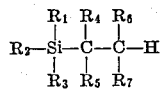

from said condensate.

3. The method as claimed in claim 2 wherein the olefinic hydrocarbon is propylene.

4. The method as claimed in claim 2 wherein the olefinic hydrocarbon is isobutylene.

5. The method as claimed in claim 2 wherein the olefinic hydrocarbon is butene-2.

6. The method as claimed in claim 2 wherein the alkyl silane is trimethylsilane.

7. The method as claimed in claim 2 wherein the alkyl silane is dimethylsilane.

8. The method of preparing compounds having the formula:

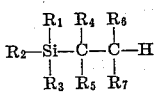

wherein $R_1$, $R_2$ and $R_7$ are separately selected from alkyl groups of 1 to 5 carbon atoms and wherein $R_3$, $R_4$, $R_5$ and $R_6$ are separately selected from the group consisting of hydrogen and alkyl, which method consists of steps of preparing an admixture of an olefinic hydrocarbon having the formula:

and an alkyl silane having the formula:

in the molar ratio of olefinic hydrocarbon to alkyl silane of from 1 to 1 to 10 to 1; passing said admixture through a chamber containing catalyst prepared by treating hot dried granules consisting essentially of silica-alumina with a silane of the formula:

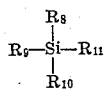

wherein $R_8$, $R_9$ and $R_{10}$ are separately selected from the group consisting of hydrogen, halogen and alkyl groups of 1 to 5 carbon atoms and $R_{11}$ is selected from the group consisting of hydrogen and alkyl groups of 1 to 5 carbon atoms; at a temperature within the range of from 75 to 250° C., under atmospheric pressure and a space rate of 0.1 to 10 mols of silane per liter of catalyst per hour; withdrawing an effluent stream from the catalyst chamber; cooling the effluent stream to a temperature to below 100° C. to obtain a condensate; and separating an organosilane of formula:

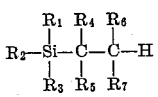

from said condensate.

9. The method as claimed in claim 8 wherein the olefinic hydrocarbon is isobutylene.

10. The method as claimed in claim 8 wherein the alkyl silane is trimethylsilane.

References Cited by the Examiner
UNITED STATES PATENTS

| | | |
|---|---|---|
| 2,510,853 | 6/1950 | Barry et al. |
| 2,721,873 | 10/1955 | Mackenzie et al. |
| 2,722,504 | 11/1955 | Fleck. |
| 2,759,960 | 8/1956 | Nishikawa et al. |
| 3,207,699 | 9/1965 | Harding et al. _____ 252—430 |

TOBIAS E. LEVOW, *Primary Examiner.*

SAMUEL H. BLECH, *Examiner.*

J. G. LEVITT, *Assistant Examiner.*